July 17, 1962  C. BAUR  3,044,380
PHOTOGRAPHIC CAMERA
Filed July 18, 1960  2 Sheets-Sheet 1

INVENTOR.
CARL BAUR
BY Toulmin & Toulmin
Attorneys

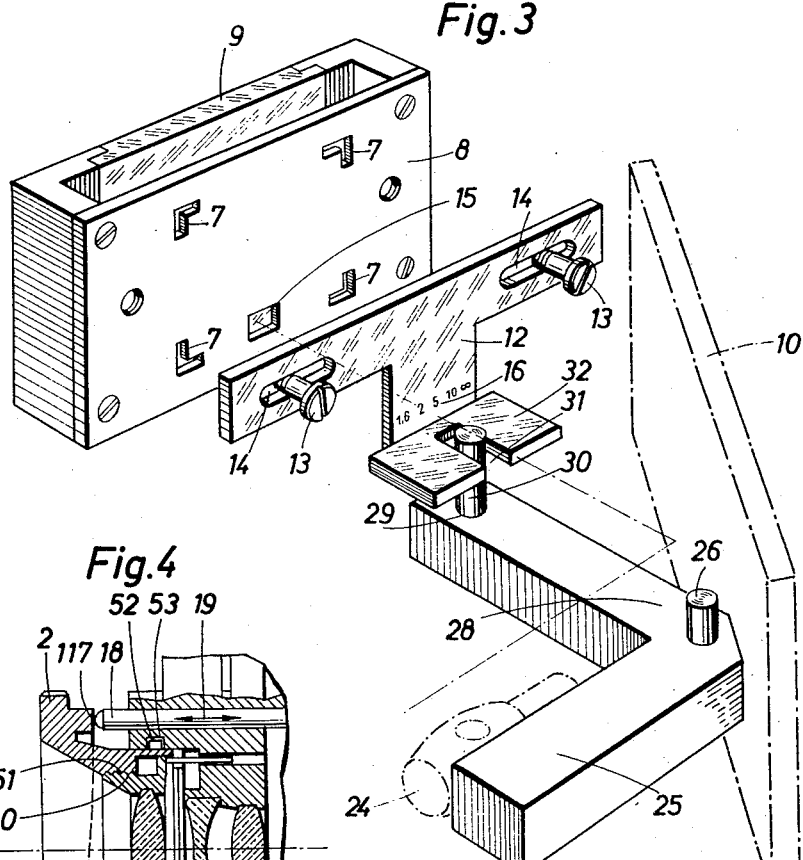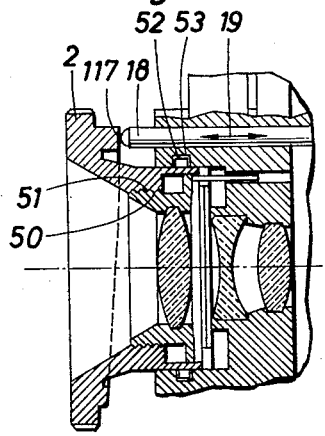

United States Patent Office 3,044,380
Patented July 17, 1962

3,044,380
PHOTOGRAPHIC CAMERA
Carl Baur, Baldham, near Munich, Germany, assignor to Agfa Aktiengesellschaft, Leverkusen, Bayerwerk, Germany, a corporation of Germany
Filed July 18, 1960, Ser. No. 43,641
Claims priority, application Germany July 28, 1959
6 Claims. (Cl. 95—44)

The present invention relates to a photographic camera and more in particular to a photographic camera having an adjustable objective and a luminous frame view finder with image field defining marks reflected in the path of rays of the view finder.

It is known to provide photographic cameras having an objective adjustable to various focusing distances and a view finder in which latter the particularly adjusted position of the objective can be read. In order to obtain such a reading the camera is provided with a scale disposed in the path of rays of the view finder and displaceable by the distance meter. These constructions suffer from the disadvantage of producing an image of the scale which is rather blurred and is not sharply focused simultaneously with the view finder image. If a sharply focused image of the scale is desired it will become necessary to provide additional optical means such as lenses or mirrors.

With the foregoing in mind it is the object of the present invention to provide a photographic camera of the type referred to wherein a sharply focused image of the distance scale is obtained in the view finder without requiring additional optical means for correcting a blurred image of the scale.

This object is accomplished by the photographic camera of the present invention which comprises a luminous frame view finder with a carrier having image field defining marks, and, disposed in the immediate vicinity of the plane of the image field defining marks, a transparent distance scale.

Furthermore, means are provided for reflecting the distance scale and the image field defining marks into the path of rays of the view finder, as well as means for adjusting the transparent distance scale depending on adjustment of the objective of the camera.

The carrier of the image field defining marks can be provided with an opening through which a particular value of the transparent distance scale is illuminated and is then reflected into the path of rays of the view finder.

The adjustment of the transparent scale depending on adjustment of the objective is preferably effected through gear or lever gear transmission means, effecting a displacement of the distance scale parallel relative to the plane of the carrier for the image field defining marks.

Further advantageous features and modifications of the present invention will become apparent upon the following, more detailed description.

The invention will be further described with reference to the accompanying drawings, wherein FIGURE 1 is a somewhat schematic, longitudinally sectional view of the photographic camera according to the invention;

FIGURE 3 is a fragmentary perspective view of part of the camera according to the invention illustrating means for controlling a transparent distance scale depending on adjustment of the objective in the camera.

FIGURE 4 is a fragmentary sectional view of another embodiment of the invention, wherein the adjustable objective is of the worm-gear-adjustment type.

Figure 1:
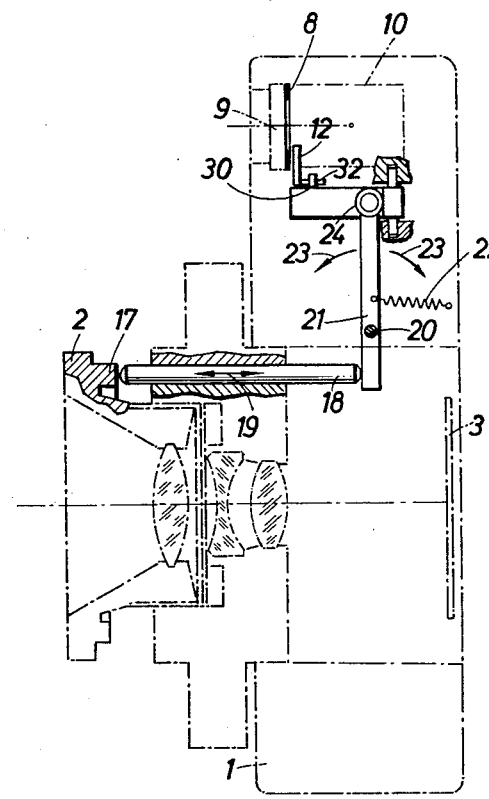
Figure 2:
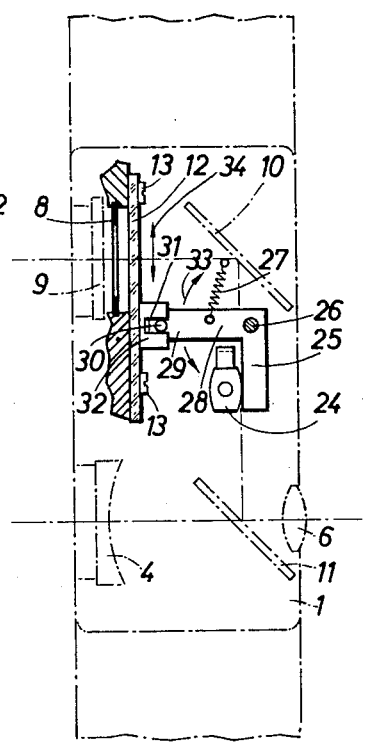
FIGURE 2 is a somewhat schematic partly sectional plan view of the photographic camera according to the invention.

Referring now to the drawings more in detail, FIGURES 1 and 2 show a camera casing 1, and a focusing ring 2 of an objective which can be adjusted relative to image plane 3 according to the distance of the object whereof a picture is to be produced. The camera is equipped with a view finder system comprising the negative view finder objective 4 and the positive view finder eye piece 6. A carrier 8 is provided with image field defining marks 7, as illustrated in FIGURE 3, as well as with a window 9. A first mirror 10 is disposed in front of carrier 8 facing image field defining marks 7, and a second, semitransparent mirror 11 is disposed parallel to mirror 10 and between objective 4 and eye piece 6. The image field defining marks 7 are illuminated through window 9 and are reflected into the path of rays of the view finder by mirrors 10 and 11.

A transparent element 12 which may have the T-shaped configuration shown in FIGURE 3, is disposed next to carrier 8 facing the image field defining marks 7 and opening 15 in carrier 8. The transparent plate 12 is connected with carrier 8 through screws 13 and slots 14 and can be displaced in parallel relative to carrier 8 which displacement is also one perpendicular to the light from window 9 through carrier 8; furthermore, transparent plate 12 bears a number of reference symbols, e.g. numerals 16, indicative of distance values, and thus forms a displaceable, transparent distance scale.

The distance values 16 are illuminated through opening 15 in carrier 8 and reflected by mirrors 10 and 11, into the path of rays of the view finder. The mirrors 10 and 11 thus reflect both the image field defining marks 7 and a distance value on transparent plate element 12 into the path of rays of the view finder.

It will be apparent that the distance values on the transparent distance scale may consist of numerical values expressed e.g. in meters or feet, as well as other symbols representing the requisite mean distances for close-up shots, group or landscape photographs and the like.

The photographic camera further comprises means for adjusting the transparent distance scale depending on adjustment of the objective of the camera, which will next be described.

The focusing ring 2 is provided with a flange portion 17 which contacts a feeling lever 18. The lever 18 is actuated by flange portion 17 whenever the objective is being adjusted, so as to move in the directions of double-headed arrow 19. The end of feeling lever 18 opposite to the end cooperating with flange portion 17 contacts the lower end of the two-armed lever 21 pivoted as at 20. Lever 21 is actuated by a tension spring 22 and is adapted to perform a rocking movement as indicated by arrows 23, while remaining in constant contact with the feeling lever 18. The uppermost end 24 of lever 21 contacts the lever arm 25 of an angular lever 28 pivotably mounted on shaft 26 and actuated by spring 27. The other lever arm 29 of angular lever 28 bears a pin 30 engaging a recess 31 of a flange portion 32 of transparent plate element 12.

The rocking movement of lever 21 in the directions of arrows 23 causes reciprocation of angular lever 28 in the directions of arrows 33, whereby transparent plate element 12 is displaced through the pin and slot connection 13, 14, parallel relative to the plane of extension of carrier 8 and in the directions indicated by double-headed arrow 34. The adjustment of focusing ring 2 thus causes displacement of the transparent plate element 12 with the distance values 16, constituting transparent distance scale means; during this displacement the distance values pass before opening 15 of carrier 8, and according to the particular adjusted position of the objective of the camera, a corresponding value of the transparent scale is illuminated through opening 15 and is reflected by mirrors 10 and 11, together with the image field boundaries, to the path of rays of the view finder.

In the embodiment of FIGURE 1, the focusing ring 2 is fixedly connected with the front lens mount of the objective, which latter is, in turn, connected with the rear member of the objective, in a known structural arrangement not illustrated in the drawings. Due to this arrangement, axial displacement of the front lens with focusing ring 2 is caused whenever the latter is turned. The feeling lever 18, in contact with contact flange 17, follows this axial displacement and actuates members 21, 24, 12, as described further above.

According to another embodiment, illustrated in FIGURE 4, the objective is of the type having worm-gear-adjusting means, and, because of this type of adjustable objective, known per se, the contact flange in contact with the feeling lever has a curve-shaped configuration.

As illustrated in FIGURE 4, the focusing ring 2 is secured against axial displacement by a bulged portion 52, positioned in a groove 53 in the camera casing. Furthermore, the focusing ring 2 is connected with the objective or its front lens by means of threading connections 50, 51. By turning the focusing ring 2, the objective is focused via threading connections 50, 51 without, however, axially displacing focusing ring 2. Due to the curve-shaped configuration of contact flange 117, the feeling lever 18, in contact with flange 117, is displaced in the direction of double-headed arrow 19, thereby actuating members such as 21, 24, 12, as described above with respect to the embodiment of FIGURE 1.

Due to the fact that the identical means, e.g. mirrors 10 and 11, are used for reflecting both distance scale and the image field defining marks into the path of rays of the view finder and, furthermore, in view of the fact that the transparent scale is disposed in the immediate vicinity, i.e. very close to the image field defining marks, a very sharp and well defined image of the scale is obtained in the view finder, simultaneously with an equally sharply focused image of the image field boundaries or defining marks. It will be apparent that this constitutes a considerable progress and advantage over the art, as additional optical means for achieving the above-mentioned end become unnecessary.

It will be understood that this invention is susceptible to modification in order to adapt it to different usages and conditions and, accordingly, it is desired to comprehend such modifications within this invention as may fall within the scope of the appended claims.

What I claim is:

1. A photographic camera comprising: a housing; an adjustable objective mounted in said housing; a view finder in said housing; a window in said housing; a carrier for image-field-defining mark means disposed in said housing adjacent said window and in the path of light entering said housing through said window; a transparent plate provided with a visible distance scale and being disposed in the immediate vicinity of said defining mark means and in the path of light entering said housing through said window; adjusting means for displacing said transparent distance scale plate depending on adjustment of said objective perpendicular to the path of the light from said window; and means for reflecting the light coming from said window and passing through said image field defining mark means of said carrier and said plate, into the path of rays of said view finder.

2. A photographic camera according to claim 1, with said scale including a plurality of distance values, said carrier having an opening allowing for the passage of light onto a particular one of said distance values of said scale for reflection into the path of rays of said view finder.

3. Photographic camera according to claim 1, said adjusting means comprising a feeling lever contacting said adjustable objective, first pivotable lever means in contact with said feeling lever, and second pivotable lever means in engagement with said first pivotable lever means, spring means actuating said first and said second pivotable lever means, a pin on said second pivotable lever means, and a slotted flange portion on said transparent scale plate engaging said pin.

4. A photographic camera according to claim 1, said adjusting means comprising a contact flange portion on said adjustable objective, a feeling lever contacting said flange portion on said adjustable objective, first pivotable lever means in contact with said feeling lever, and second pivotable lever means in engagement with said first pivotable lever means, spring means actuating said first and said second pivotable lever means, a pin on said second pivotable lever means, and a slotted flange portion on said transparent scale plate engaging said pin.

5. A photographic camera according to claim 1, said adjusting means comprising a curve-shaped contact flange portion on said adjustable objective, a feeling lever contacting said flange portion on said adjustable objective, first pivotable lever means in contact with said feeling lever, and second pivotable lever means in engagement with said first pivotable lever means, spring means actuating said first and said second pivotable lever means, a pin on said second pivotable lever means, and a slotted flange portion on said transparent scale plate engaging said pin.

6. A photographic camera comprising: a housing; an adjustable objective mounted in said housing; a view finder in said housing; a window in said housing; a carrier for image-field-defining mark means disposed in said housing adjacent said window and in the path of light entering said housing through said window; a transparent plate provided with a visible distance scale and being disposed in the immediate vicinity of said defining mark means and in the path of light entering said housing through said window; lever gear adjusting means for displacing said transparent plate depending on adjustment of said objective, perpendicular to the path of the light from said window; and means for reflecting the light coming from said window and passing through said image field defining mark means of said carrier and said plate, into the path of rays of said view finder.

References Cited in the file of this patent

UNITED STATES PATENTS

| 926,912 | Vogt et al. | July 9, 1909 |
| 1,991,110 | Mihalyi | Feb. 12, 1935 |
| 2,554,798 | Schwartz et al. | May 29, 1951 |

FOREIGN PATENTS

| 676,075 | Great Britain | July 23, 1952 |